US012304206B2

(12) United States Patent
Kubo et al.

(10) Patent No.: US 12,304,206 B2
(45) Date of Patent: May 20, 2025

(54) LIQUID DISCHARGE HEAD AND LIQUID DISCHARGE APPARATUS

(71) Applicants: Isamu Kubo, Kanagawa (JP); Keitaroh Sakai, Kanagawa (JP)

(72) Inventors: Isamu Kubo, Kanagawa (JP); Keitaroh Sakai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 153 days.

(21) Appl. No.: 18/114,988

(22) Filed: Feb. 28, 2023

(65) Prior Publication Data

US 2023/0278338 A1 Sep. 7, 2023

(30) Foreign Application Priority Data

Mar. 3, 2022 (JP) ................................ 2022-032743

(51) Int. Cl.
*B41J 2/14* (2006.01)
*B41J 29/377* (2006.01)

(52) U.S. Cl.
CPC ......... *B41J 2/1433* (2013.01); *B41J 2/14274* (2013.01); *B41J 29/377* (2013.01); *B41J 2202/05* (2013.01)

(58) Field of Classification Search
CPC .... B41J 2/1433; B41J 2/14274; B41J 29/377; B41J 2202/05; B41J 2202/08; B41J 2/14201; B41J 2202/12
See application file for complete search history.

(56) References Cited

U.S. PATENT DOCUMENTS

| | | | |
|---|---|---|---|
| 2022/0105722 A1 | 4/2022 | Kubo et al. | |
| 2022/0111638 A1 | 4/2022 | Tachibana et al. | |
| 2022/0379609 A1 | 12/2022 | Matsufuji et al. | |

FOREIGN PATENT DOCUMENTS

| | | | |
|---|---|---|---|
| JP | 2019-122955 | 7/2019 | |
| JP | 2021-151767 | 9/2021 | |
| JP | 2021151767 A * | 9/2021 | .......... B41J 2/14201 |

* cited by examiner

*Primary Examiner* — Justin Seo
*Assistant Examiner* — Tracey M McMillion
(74) *Attorney, Agent, or Firm* — XSENSUS LLP

(57) ABSTRACT

A liquid discharge head includes a nozzle plate having a nozzle from which a liquid is discharged, a housing holding the nozzle plate, a valve that opens and closes the nozzle, an expandable driver disposed inside the housing, and a restraint. The expandable driver has a first end that supports a rear end of the valve and a second end fixed to the housing. The expendable driver moves the valve in a longitudinal direction to push a leading end of the valve against the nozzle to close the nozzle. The restraint positions the second end with respect to the housing in the longitudinal direction. A difference between ΔL1 and ΔL2 is equal to or less than a predetermined value, where ΔL1 represents a thermal deformation amount of a first length due to temperature change, and ΔL2 represents a thermal deformation amount of a second length due to the temperature change.

11 Claims, 8 Drawing Sheets

LIQUID DISCHARGE HEAD AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-032743, filed on Mar. 3, 2022, in the Japan Patent Office, the entire disclosure of which is hereby incorporated by reference herein.

BACKGROUND

Technical Field

Embodiments of the present disclosure relate to a liquid discharge head including a driver such as a piezoelectric element and a liquid discharge apparatus incorporating the liquid discharge head.

Related Art

Examples of an image forming apparatus including a liquid discharge device includes an inkjet printer. An inkjet head (liquid discharge head) of the liquid discharge device has a nozzle from which liquid droplets are discharged toward a recording medium. A valve that opens and closes the nozzle is disposed inside the liquid discharge head relative to the nozzle, and an expandable driver including a piezoelectric element or the like that expands and contracts in a longitudinal direction thereof is coupled to the valve. The valve is moved to open and close the nozzle by the expansion and contraction operation (vibration) of the expandable driver in the longitudinal direction, and the high-pressure ink is discharged as droplets from the nozzle at the moment when the nozzle is opened by the valve.

SUMMARY

Embodiments of the present disclosure describe an improved liquid discharge head that includes a nozzle plate, a housing, a valve, an expandable driver, and a restraint. The nozzle plate has a nozzle from which a liquid is discharged. The housing holds the nozzle plate. The valve has a leading end and a rear end opposite to the leading end in a longitudinal direction of the valve. The valve opens and closes the nozzle. The expandable driver is disposed inside the housing. The expendable driver has a first end that supports the rear end of the valve and a second end opposite to the first end. The second end is fixed to the housing. The expandable driver moves the valve in the longitudinal direction to push the leading end of the valve against the nozzle to close the nozzle. The restraint positions the second end of the expandable driver with respect to the housing in the longitudinal direction. A difference between ΔL1 and ΔL2 is equal to or less than a predetermined value, where ΔL1 represents a thermal deformation amount of a first length L1, from the restraint to the leading end of the valve, due to temperature change ΔT, and ΔL2 represents a thermal deformation amount of a second length L2, from the restraint to an inner surface of the nozzle plate to which the leading end of the valve contacts, due to the temperature change ΔT. Alternatively, in another embodiment, ΔL1 is equal to ΔL2.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
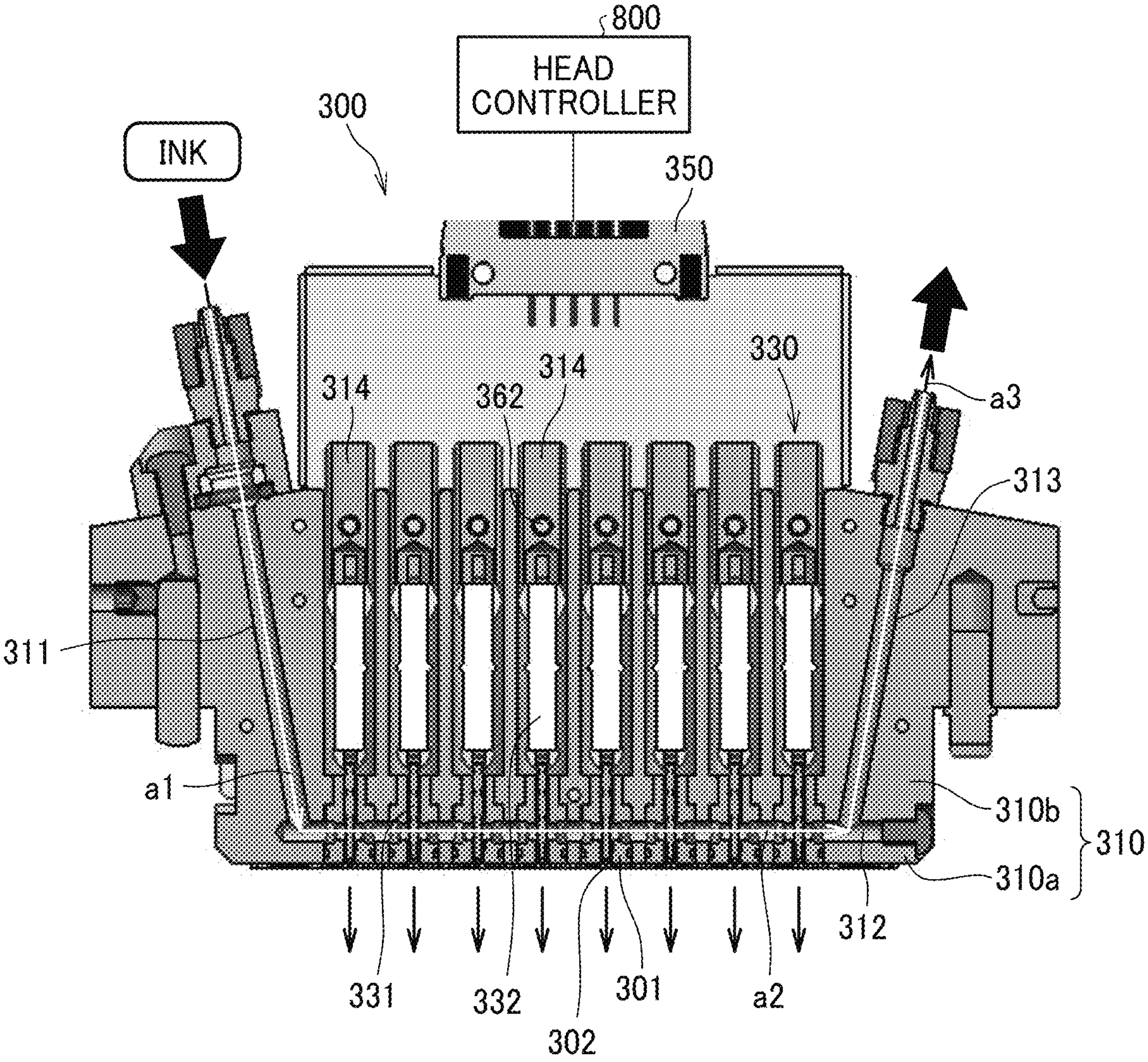
FIG. 1 is an overall cross-sectional view of a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Liquid Discharge Head

A liquid discharge head according to an embodiment of the present disclosure is described below with reference to the drawings. FIG. 1 is an overall cross-sectional view of a liquid discharge head 300. The liquid discharge head 300 includes a housing 310 including a lower housing 310*a* and an upper housing 310*b* joined (stacked) on the lower housing 310*a*.

The lower housing 310*a* is made of a material having a high thermal conductivity such as metal, and the upper housing 310*b* is made of a material having a low thermal conductivity such as resin. The upper housing 310*b* includes a connector 350 for communication of electrical signals at an upper portion thereof.

The lower housing 310*a* holds a nozzle plate 301. The nozzle plate 301 has a plurality of nozzles 302 from which a liquid is discharged. In the present embodiment, eight nozzles 302 are arranged at equal intervals in one row on the nozzle plate 301. The number of nozzles 302 and the number of rows arranged on the nozzle plate 301 are not limited to the above-described example.

The liquid discharge head 300 is connected to a head controller 800 as circuitry, which is described later.

Liquid Discharge Module

In the liquid discharge head 300, eight liquid discharge modules 330 are arranged corresponding to the eight nozzles 302. The longitudinal direction (vertical direction in FIG. 1) of each liquid discharge module 330 is perpendicular to the nozzle plate 301.

A channel 312 as a fluid passage extending from a supply port 311 on the left side in FIG. 1 to a collection port 313 on the right side in FIG. 1 is disposed on the nozzle plate 301. The supply port 311 and the collection port 313 are disposed in the upper housing 310*b*.

The liquid discharge module 330 includes a needle-shaped valve 331 and a piezoelectric element 332 that drives the valve 331. The valve 331 has a leading end and a rear end opposite to the leading end in a longitudinal direction of the valve 331. The rear end of the valve 331 is supported by a first end of the piezoelectric element 332 in the longitudinal direction thereof. The valve 331 includes a seal 331*a* made of resin such as TEFLON (registered trademark) at the leading end thereof.

A voltage is applied to the piezoelectric element 332 to expand and contract the piezoelectric element 332 in the longitudinal direction of the piezoelectric element 332. That is, as the voltage is applied to the piezoelectric element 332, the piezoelectric element 332 expands in the longitudinal direction, and as the application of the voltage is stopped, the piezoelectric element 332 returns to the original length thereof. The piezoelectric element 332 is an example of an expandable driver.

Ink (liquid) in the channel 312 is discharged as a droplet from the nozzle 302 by the expansion and contraction operation (vibration) of the piezoelectric element 332 of the liquid discharge module 330.

In the upper housing 310*b*, a restraint 314 is disposed at a position facing a second end, which is opposite to the first end, of the piezoelectric elements 332 in the longitudinal direction. The restraint 314 is in contact with the second end (the upper end in the drawings) of the piezoelectric element 332 to define a fixing point (reference point) of the piezoelectric element 332.

Figure 2A:
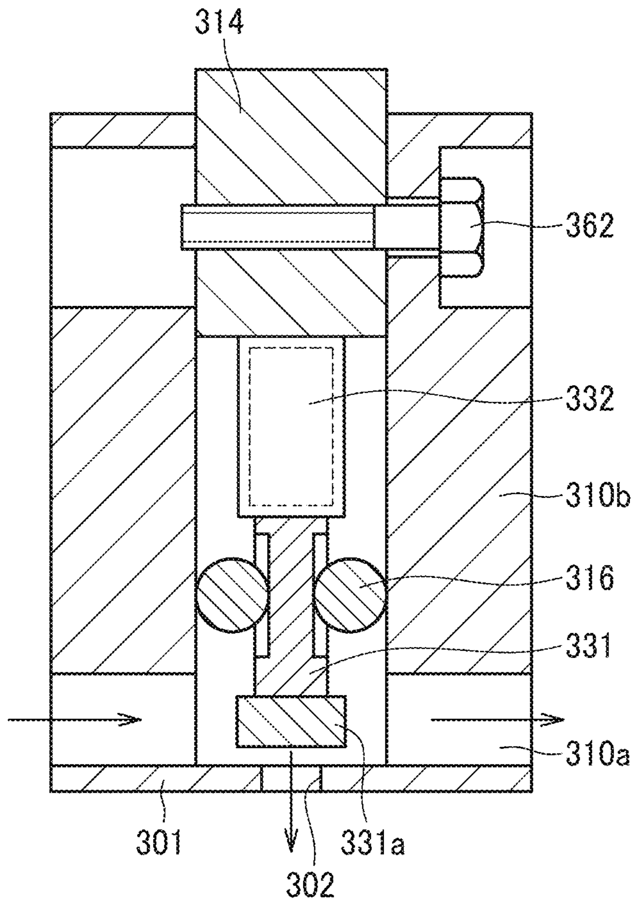
FIG. 2A is a cross-sectional view of a liquid discharge module during non-driving.
Figure 2B:
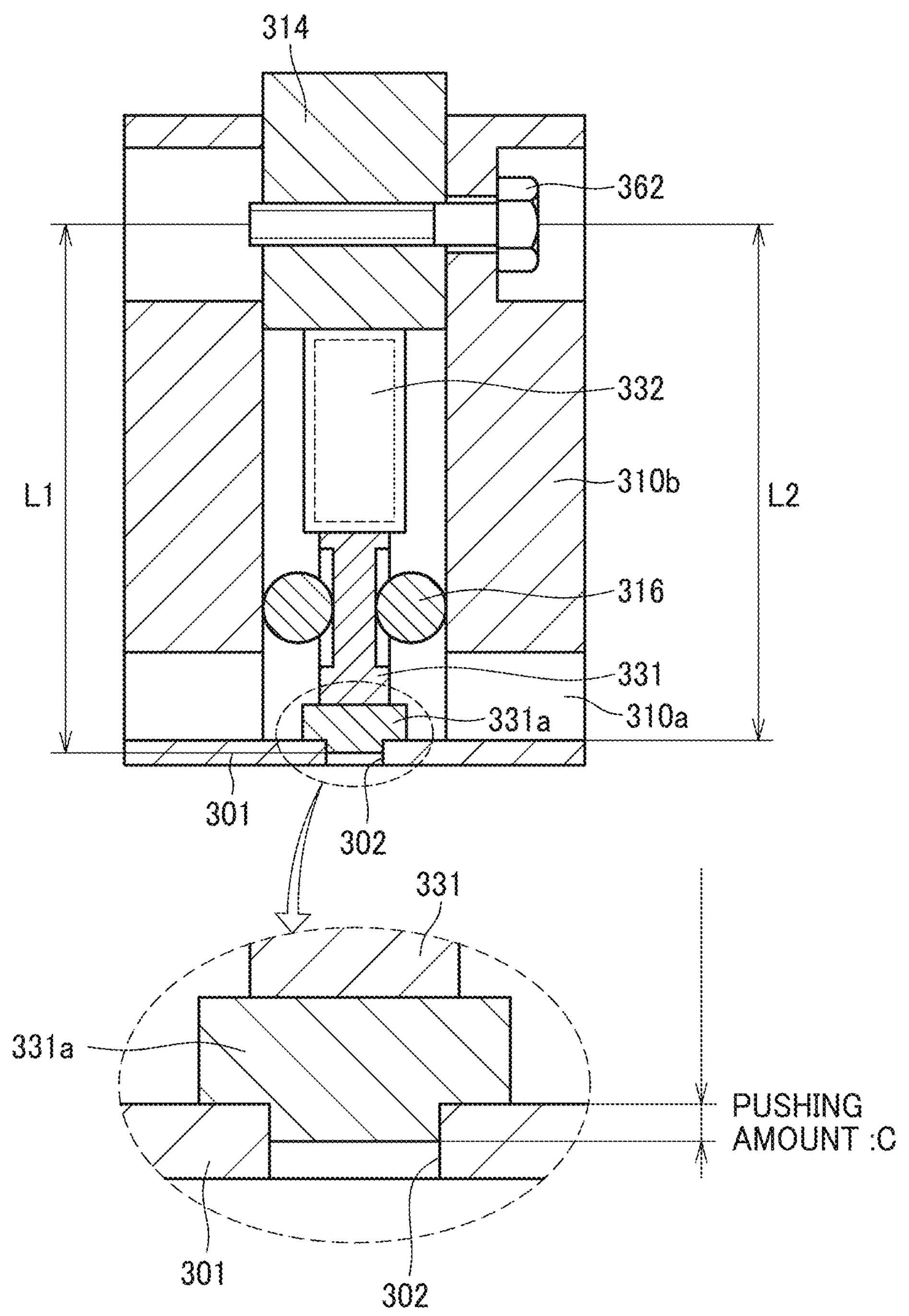
FIG. 2B is a cross-sectional view of the liquid discharge module during driving.

As illustrated in FIGS. 2A and 2B, an O-ring 316 as a sealing member is disposed between the lower housing 310*a* and the upper housing 310*b*. The O-ring 316 prevents ink (liquid) from leaking over the valve 331 and reaching the piezoelectric element 332.

The position of the restraint 314 in the vertical direction is adjusted and fixed to the upper housing 310*b* as follows. First, a bolt 362 is loosened, and the position of the restraint 314 in the vertical direction is adjusted in a state in which the bolt 362 is loosened. At this time, a predetermined size of clearance is formed between the nozzle 302 and the seal 331*a* of the valve 331 as illustrated in FIG. 2A.

If the clearance is too large, a desired discharge amount of ink may not be obtained, and the ink may leak when the seal 331*a* contacts the nozzle plate 301 as illustrated in the FIG. 2B. On the other hand, if the clearance is too small, the desired discharge amount of ink may not be obtained, and an excessive compressive force may act on the seal 331*a* when the seal 331*a* contacts the nozzle plate 301 as illustrated in the FIG. 2B. As a result, the useful life of the seal 331*a* may be shortened and the ink may leak.

After adjusting the position of the restraint 314 in the vertical direction, the bolt 362 is fastened. As a result, the outer peripheral surface of the restraint 314 fits into the inner peripheral surface of the upper housing 310*b*. Thus, the position of the restraint 314 is fixed relative to the upper housing 310*b* to position the second end of the piezoelectric element 332 with respect to the housing 310 in the longitudinal direction and fix the second end to the housing 310.

Operation of Liquid Discharge Module

A pressurized liquid, such as ink or paint, is taken into the supply port 311 from the outside of the liquid discharge head 300, fed in the direction indicated by arrow a1 in FIG. 1, and supplied to the channel 312. The liquid supplied from the supply port 311 is fed through the channel 312 in the direction indicated by arrow a2 in FIG. 1. Then, the liquid that is not discharged from the nozzles 302 arranged along the channel 312 is collected through the collection port 313 in the direction indicated by arrow a3 in FIG. 1. The channel 312 as the fluid passage supplies the liquid to a portion between the valve 331 and nozzle 302 in the housing 310.

As illustrated in FIG. 2A, during non-driving in which no voltage is applied to the piezoelectric element 332, the valve 331 moves upward, thereby opening the nozzle 302 (i.e., a nozzle open state). In this nozzle open state, droplets of ink can be discharged from the nozzle 302.

In addition, as illustrated in FIG. 2B, during driving in which a voltage is applied to the piezoelectric element 332, the valve 331 moves downward and a part of the seal 331*a* (i.e., the leading end) of the valve 331 bites into (is pushed against) the nozzle 302 with a pushing amount C. As a result, the nozzle 302 is closed (i.e., a nozzle closed state), and no droplet is discharged from the nozzle 302.

Thermal Expansion of Liquid Discharge Head

A thermal expansion of the liquid discharge head 300 is described below. When the piezoelectric element 332 is continuously driven at a high frequency, thermal expansion occurs in the piezoelectric element 332 and the valve 331 due to heat generated in the piezoelectric element 332. As illustrated in FIGS. 2A and 2B, since the upper end (i.e., the second end) of the piezoelectric element 332 is fixed at the fixing point (reference point) by the restraint 314, when the piezoelectric element 332 thermally expands, the valve 331 is pushed toward the nozzle plate 301.

In addition, the heat from the piezoelectric element 332 is also transferred to the valve 331 in contact with the piezoelectric element 332, and the valve 331 also thermally expands toward the nozzle plate 301. As a result, the seal 331*a* of the valve 331 bites deeper into the nozzle 302 than the state illustrated in FIG. 2B. As a result, an excessive compressive force acts on the seal 331*a*, which may shorten the useful life of the seal 331*a* and may cause ink to leak.

An amount of displacement of the valve 331 by the operation of the piezoelectric element 332 is constant (for example, about 15 μm). Accordingly, it is difficult to open the nozzle 302 as the pushing amount of the seal 331*a* of the valve 331 against the nozzle 302 increases. As a result, in the nozzle open state illustrated in FIG. 2A, the clearance between the nozzle 302 and the seal 331*a* of the valve 331 is reduced, thereby increasing the fluid resistance of ink. Thus, the discharge speed of ink from the nozzle 302 may decrease, and the desired discharge amount of ink may not be obtained.

In addition, the nozzle plate 301 and the housing 310 may expand or contract depending on an ambient temperature around the liquid discharge head 300. When the housing 310 expands or contracts, an appropriate clearance may not be obtained between the nozzle plate 301 and the seal 331*a* of the valve 331. Accordingly, the desired discharge amount of ink may not be obtained similarly to when the piezoelectric element 332 generates heat.

In the present embodiment, an amount of thermal deformation ΔL1 of components related to the liquid discharge module 330 including the piezoelectric element 332 and the valve 331 and an amount of thermal deformation ΔL2 of components related to the nozzle plate 301 and the housing 310 are set so as to satisfy the following relation. As a result, the relative position between the nozzle plate 301 and the valve 331 are unchanged even if a temperature changes, thereby obtaining the desired discharge amount of ink without ink leakage.

$$\Delta L1=\Delta L2$$

- L1: a first length from the axis of the bolt 362 (the restraint 314) to the leading end of the seal 331*a*, of the valve 331 at a temperature T (i.e., a normal temperature)
- L2: a second length from the axis of the bolt 362 to the inner surface of the nozzle plate 301 to which the leading end of the seal 331*a* of the valve 331 contacts at the temperature T (the normal temperature)
- ΔL1: a first thermal deformation amount of the first length L1 due to temperature change ΔT
- ΔL2: a second thermal deformation amount of the second length L2 due to the temperature change ΔT The first and second thermal deformation amounts ΔL1 and ΔL2 can be expressed by the following equations.

$$\text{The first thermal deformation amount } \Delta L1 \text{ of the length } L1\text{: } \Delta L1=\Sigma(\text{linear expansion coefficient} \times \text{length of each component} \times \text{temperature change } \Delta T)$$

$$\text{The second thermal deformation amount } \Delta L2 \text{ of the length } L2\text{: } \Delta L2=\Sigma(\text{linear expansion coefficient} \times \text{length of each component} \times \text{temperature change } \Delta T)$$

Σ represents a sum of the thermal deformation amounts of multiple components related to the liquid discharge module 330 including the piezoelectric element 332 and the valve 331, or the nozzle plate 301 and the housing 310.

Examples of Material and Length of Components

Examples of materials, linear expansion coefficients, and lengths of components related to the liquid discharge module 330 including the piezoelectric element 332 and the valve 331, and the nozzle plate 301 and the housing 310 are described below.

- Seal 331*a*: TEFLON (registered trademark) (linear expansion coefficient: $1.0\times10^{-4}$, length: 0.6 mm)
- Valve 331: steel use stainless (SUS)303 (linear expansion coefficient: $18.7\times10^{-6}$, length: 11 mm)
- Piezoelectric element 332: lead zirconate titanate (linear expansion coefficient: $-5.0\times10^{-6}$, length: 40 mm)
- Bolt 362: SUS430 (linear expansion coefficient: $10.4\times10^{-6}$, length: 30 mm)
- Housing 310: SUS430 (linear coefficient of expansion: $10.4\times10^{-6}$, length: 81.6 mm)

The first and second thermal deformation amounts ΔL1 and ΔL2 are calculated based on the above-described values.

Pushing Amount of Seal

Figure 3:
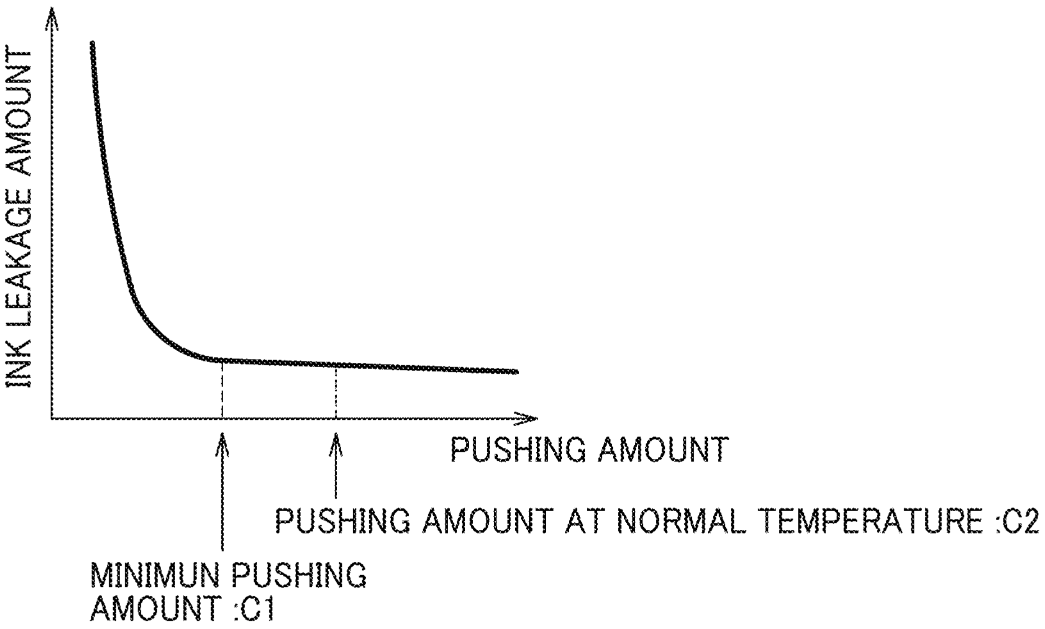
FIG. 3 is a graph illustrating a relation between a pushing amount of a seal of a valve of the liquid discharge head against a nozzle and an amount of ink leakage.

The pushing amount of the seal 331*a* is described below. FIG. 3 is a graph illustrating a relation between the pushing amount of the seal 331*a* against the nozzle 302 and an amount of ink leakage. As it can be seen from this graph, when the pushing amount of the seal 331*a* becomes large to some extent, the amount of ink leakage sharply decreases. In FIG. 3, a minimum pushing amount C1 (e.g., C1=3 μm) is the lower limit at which the amount of ink leakage is allowable.

At the temperature T (i.e., the normal temperature), a desired pushing amount C2 (i.e., a reference pushing amount to be adjusted, e.g., C2=5 μm) is larger than the allowable minimum pushing amount C1. The position of the restraint 314 in the vertical direction is adjusted to position the second end of the piezoelectric element 332 in the longitudinal direction relative to the housing 310, and the first and second thermal deformation amounts ΔL1 and ΔL2 are set so as to satisfy that the first thermal deformation amount ΔL1 is equal to the second thermal deformation amount ΔL2 as described above. Thus, the pushing amount C2 can be obtained even when the temperature changes. However, it may be difficult to correctly set the first thermal deformation amount ΔL1 equal to the second thermal deformation amount ΔL2.

Since the pushing amount C is calculated by subtracting the second length L2 from the first length L1, When the first thermal deformation amount ΔL1 of the first length L1(expansion amount) is smaller than the second thermal deformation amount ΔL2 of the second length L2 (expansion amount) due to temperature change, the pushing amount C decreases, and the seal 331*a* of the valve 331 may not sufficiently seal (close) the nozzle 302.

On the other hand, when the first thermal deformation amount ΔL1 of the first length L1 (expansion amount) is larger than the second thermal deformation amount ΔL2 of the second length L2 (expansion amount) due to temperature change, the pushing amount C increases, and the seal 331*a* of the valve 331 may be plastically deformed, thereby deteriorating sealing performance.

In the present embodiment, the pushing amount C is adjusted so as to satisfy a relation of C1≤C≤C2 even when the first thermal deformation amount ΔL1 deviates from the second thermal deformation amount ΔL2. That is, the difference between the first thermal deformation amount ΔL1 and the second thermal deformation amount ΔL2 is set equal to or less than a predetermined value that satisfies the relation C1≤C≤C2. In other words, the predetermined vale is (C2−C1). Preferably, the difference between the first thermal deformation amount ΔL1 and the second thermal deformation amount ΔL2 is set to 0 (i.e., ΔL1=ΔL2). As a result, the seal 331*a* of the valve 331 reliably seals (closes) the nozzle 302 in the nozzle closed state illustrated in FIG. 2B, and the seal 331*a* of the valve 331 reliably opens the nozzle 302 to discharge the desired discharge amount of ink in the nozzle open state illustrated in FIG. 2A. In the present embodiment, the housing 310 and the nozzle plate 301 are separate components (separate bodies), but both components may be formed as a single body.

Cooling of Piezoelectric Element and Housing

Figure 4:
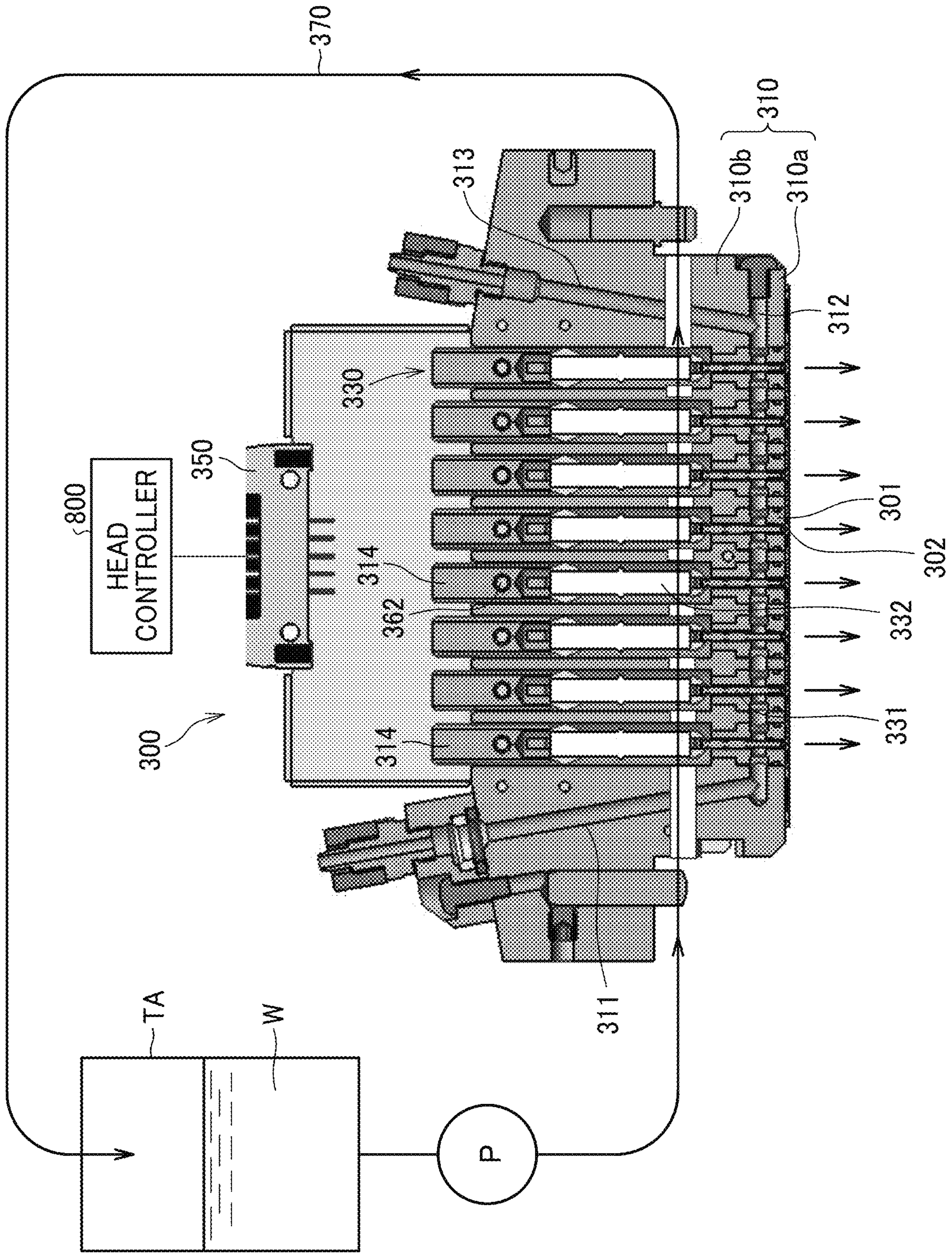
FIG. 4 is a cross-sectional view of the liquid discharge head including a coolant passage for a coolant.

One of factors of the above-described temperature change (temperature rise) ΔT is heat generation of the piezoelectric element 332. FIG. 4 illustrates the liquid discharge head 300 according to another embodiment in which the piezoelectric element 332 is cooled by a liquid W as a coolant to reduce the temperature change ΔT.

That is, the housing 310 has a coolant passage 370 through which the liquid W is circulated, which is formed so as to traverse the space of the upper housing 310*b* accommodating the multiple piezoelectric elements 332 in the lateral direction, and the coolant passage 370 is connected to a liquid tank TA and a pump P to circulate the liquid W through the coolant passage 370 and a circulation path, which is connectable to the inlet of the coolant passage 370, outside the housing 310. In other words, the coolant passage 370 is disposed across the multiple piezoelectric elements 332 disposed in a transverse direction orthogonal to the longitudinal direction. Note that the coolant passage 370 and the channel 312 as the fluid passage are separated from each other in the housing 310. Since the liquid W is circulated, the consumption of the liquid W can be reduced.

Since the piezoelectric elements 332 and the housing 310 are cooled by the liquid W, the first and second thermal deformation amounts ΔL1 and ΔL2 can be reduced. If the liquid W has low dielectric strength, the piezoelectric element 332 may operate unstably. An electrical insulating fluid having high dielectric strength is used as the liquid W, and thus the liquid discharge head 300 can be cooled by the liquid W stably and safely.

For example, a fluorine-based inert liquid can be used as the electrical insulating fluid having high dielectric strength. The fluorine-based inert liquid is an organic solution containing fluorine, such as perfluoropolyether (PFPE), perfluorocarbon (PFC), and hydrafluoroether (HFE).

Figure 5:
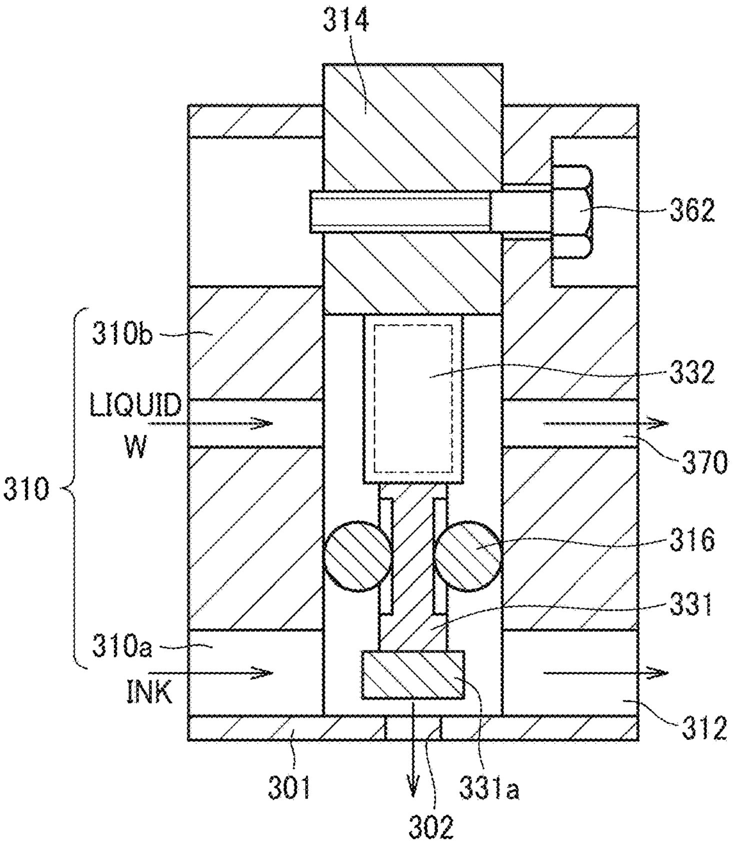
FIG. 5 is an enlarged view of a part of the liquid discharge head illustrated in FIG. 4.

Due to the cooling by the liquid W the difference between the first thermal deformation amount ΔL1 and the second thermal deformation amount ΔL2 can also be reduced. As a result, the seal 331*a* of the valve 331 reliably seals (closes) the nozzle 302 in the nozzle closed state illustrated in FIG. 2B, and the seal 331*a* of the valve 331 reliably opens the nozzle 302 to discharge the desired discharge amount of ink in the nozzle open state illustrated in FIG. 2A and FIG. 5.

Figure 6:
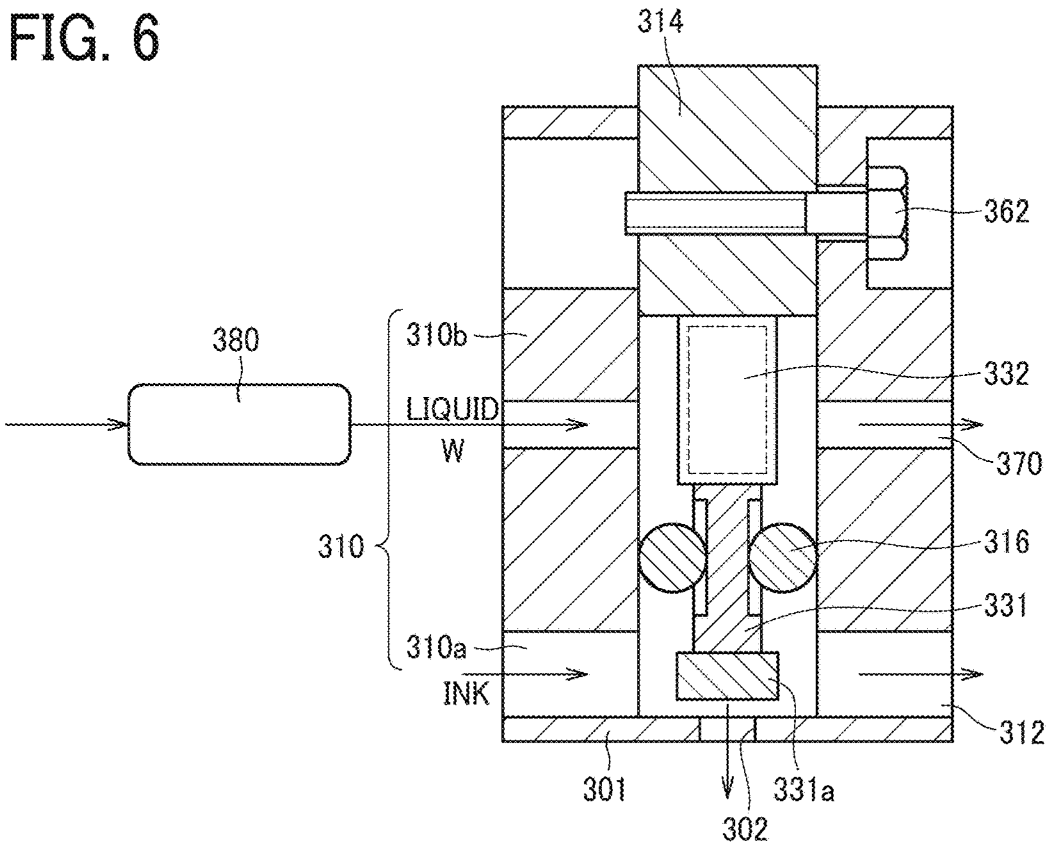
FIG. 6 is a cross-sectional view of the liquid discharge head in which a cooling device is connected to the coolant passage for the coolant.

As illustrated in FIG. 6, a cooling device 380 that supplies the liquid W to the housing 310 is connected to the inlet of the coolant passage 370 of the housing 310 to enhance cooling effect of the liquid W on the piezoelectric elements 332 and the housing 310. As a result, the difference between the first thermal deformation amount ΔL1 and the second thermal deformation amount ΔL2 can be further reduced. Accordingly, the seal 331*a* of the valve 331 more reliably seals (closes) the nozzle 302 in the nozzle closed state illustrated in FIG. 2B, and the seal 331*a* of the valve 331 more reliably opens the nozzle 302 to discharge the desired discharge amount of ink in the nozzle open state illustrated in FIG. 2A and FIG. 6.

Pump Control

Figure 7A:
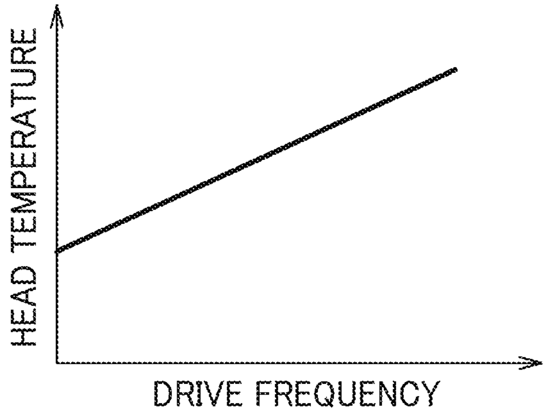
FIG. 7A is a graph of a head temperature against a drive frequency of an expandable driver of the liquid discharge head.
Figure 7B:
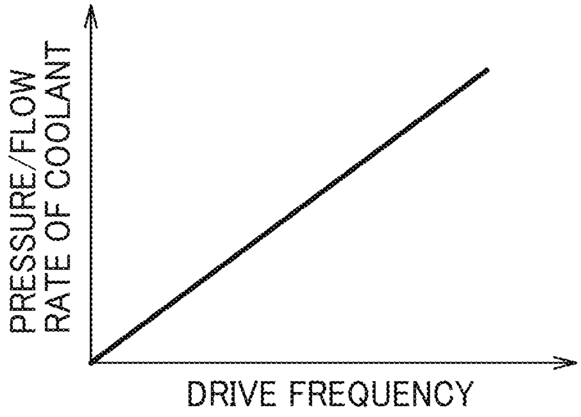
FIG. 7B is a graph of a pressure and a flow rate of the coolant against the drive frequency of the expandable driver.

The pump P can be controlled as illustrated in FIG. 7B to appropriately cool the piezoelectric element 332 and the housing 310. As illustrated in FIG. 7A, the temperature of the liquid discharge head 300 rises as the number of times of driving of the piezoelectric element 332 per unit time (i.e., drive frequency or vibration frequency) increases.

Figure 7C:
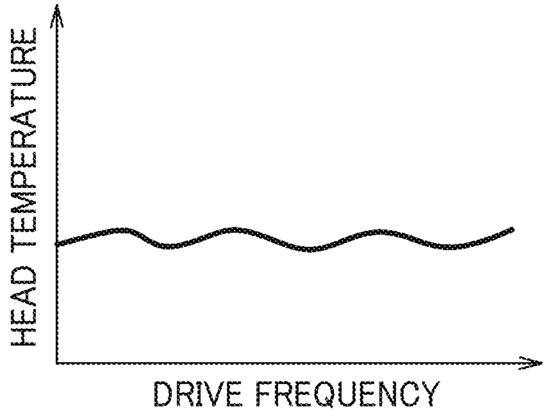
FIG. 7C is a graph of the head temperature against the drive frequency of the expandable driver When the coolant is flown.

Since the increase in the temperature of the liquid discharge head 300 is proportional to the drive frequency of the piezoelectric element 332, the pressure or flow rate of the liquid W as the coolant fed from the pump P is set proportional to the drive frequency of the piezoelectric element 332. In other words, the head controller 800 included a liquid discharge apparatus increases the pressure or flow rate of the liquid W with an increase in the drive frequency of the piezoelectric element 332. As a result, the piezoelectric element 332 and the housing 310 are appropriately cooled without excessive or insufficient cooling, and thus the temperature change of the liquid discharge head 300 can be reduced as illustrated in FIG. 7C.

Liquid Discharge Apparatus

Figure 8B:
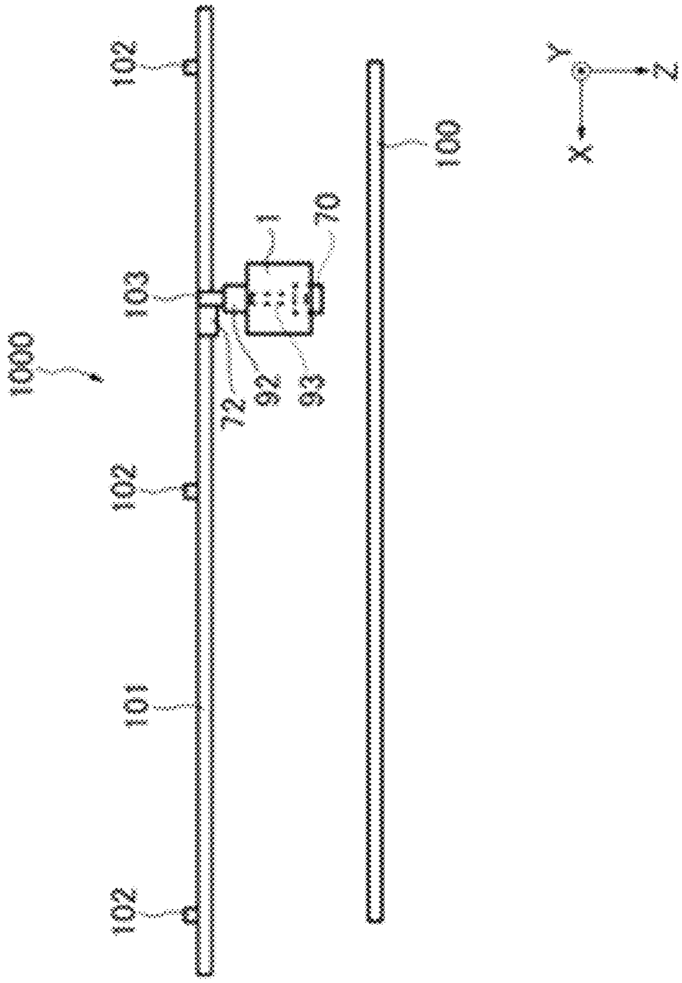
FIGS. 8A and 8B are overall schematic views of a liquid discharge apparatus according to the present embodiment.
Figure 8A:
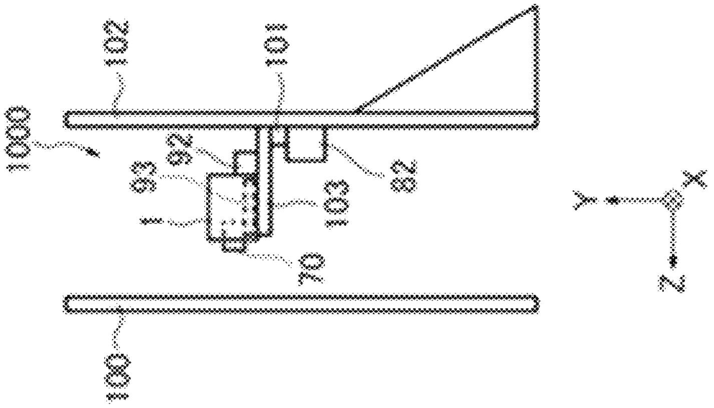

FIGS. 8A and 8B are overall schematic views of a liquid discharge apparatus 1000 including the liquid discharge head 300 and the head controller 800 described above. FIG. 8A is a side view of the liquid discharge apparatus 1000, and FIG. 8B is a plan view of the liquid discharge apparatus 1000. The liquid discharge apparatus 1000 is installed so as to face an object 100 on which images are drawn. The liquid discharge apparatus 1000 includes an X-axis rail 101, a Y-axis rail 102 intersecting the X-axis rail 101, and a Z-axis rail 103 intersecting the X-axis rail 101 and the Y-axis rail 102.

The Y-axis rail 102 movably holds the X-axis rail 101 along the Y-axis. The X-axis rail 101 movably holds the Z-axis rail 103 along the X-axis. The Z-axis rail 103 movably holds a carriage 1 along the Z-axis.

The liquid discharge apparatus 1000 includes a first Z-direction driver 92 and an X-direction driver 72. The first Z-direction driver 92 moves the carriage 1 along the Z-axis along the Z-axis rail 103. The X-direction driver 72 moves the Z-axis rail 103 along the X-axis along the X-axis rail 101. The liquid discharge apparatus 1000 further includes a Y-direction driver 82 that moves the X-axis rail 101 along the Y-axis along the Y-axis rail 102. Further, the liquid discharge apparatus 1000 includes a second Z-direction driver 93 that moves a head holder 70 relative to the carriage 1 along the Z-axis.

The liquid discharge head 300 described above is attached to the head holder 70 so that the nozzles 302 of the liquid discharge head 300 face the object 100 when used. The liquid discharge apparatus 1000 described above discharges ink, as an example of a liquid, from the liquid discharge head 300 attached to the head holder 70 toward the object 100 while moving the carriage 1 along the X-axis, the Y-axis, and the-Z axis, thereby drawing images on the object 100. That is, the carriage 1 mounts the liquid discharge head 300 attached to the head holder 70 to move the liquid discharge head 300.

Although some embodiments of the present disclosure have been described above, embodiments of the present disclosure are not limited to the embodiments described above, and a variety of modifications can be made within the scope of the present disclosure. For example, the piezoelectric element 332 can be replaced with another driver that expands and contracts in the longitudinal direction. For example, a piston that is reciprocally moved in the longitudinal direction by an electromagnetic solenoid may be used instead of the piezoelectric element 332.

As described above, according to the present disclosure, the liquid discharge head can be provided that appropriately opens and closes the nozzle regardless of temperature change.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge head, comprising:

a nozzle plate having a nozzle from which a liquid is discharged;

a housing holding the nozzle plate;

a valve having a leading end and a rear end opposite to the leading end in a longitudinal direction of the valve, the valve configured to open and close the nozzle;

an expandable driver disposed inside the housing and having:

a first end that supports the rear end of the valve; and a second end opposite to the first end, the second end fixed to the housing, the expandable driver configured to move the valve in the longitudinal direction to push the leading end of the valve against the nozzle to close the nozzle; and a restraint configured to position the second end of the expandable driver with respect to the housing in the longitudinal direction, wherein a difference between $\Delta L1$ and $\Delta L2$ is equal to or less than a predetermined value of $(C2-C1)$, where C1 represents a minimum pushing amount of the valve against the nozzle, C2 represents a pushing amount of the valve against the nozzle at a normal temperature, $\Delta L1$ represents a thermal deformation amount of a first length L1, from the restraint to the leading end of the valve, due to temperature change $\Delta T$, and $\Delta L2$ represents a thermal deformation amount of a second length L2, from the restraint to an inner surface of the nozzle plate to which the leading end of the valve contacts, due to the temperature change $\Delta T$.

2. The liquid discharge head according to claim 1, wherein the housing has a coolant passage through which a coolant is circulated.

3. The liquid discharge head according to claim 2, wherein the coolant passage has an inlet connected to a cooling device that supplies the coolant to the housing.

4. The liquid discharge head according to claim 3, wherein a circulation path outside the housing is connectable to the inlet to circulate the coolant through the coolant passage and the circulation path.

5. The liquid discharge head according to claim 3, further comprising:

a fluid passage configured to supply the liquid to a portion between the valve and the nozzle in the housing, wherein the coolant passage and the fluid passage are separated in the housing.

6. The liquid discharge head according to claim 2, wherein the coolant is an electrical insulating fluid.

7. The liquid discharge head according to claim 2, further comprising:

multiple expandable drivers including the expandable driver, wherein the multiple expandable drivers are disposed in a transverse direction orthogonal to the longitudinal direction, and the coolant passage is disposed across the multiple expandable drivers in the transverse direction.

8. A liquid discharge apparatus, comprising:

the liquid discharge head according to claim 2; and circuitry configured to increase a flow rate of the coolant circulated through the coolant passage with an increase in a drive frequency of the expandable driver.

9. A liquid discharge apparatus, comprising:

the liquid discharge head according to claim 2; and circuitry configured to increase a pressure of the coolant supplied to the housing with an increase in a drive frequency of the expandable driver.

10. A liquid discharge apparatus, comprising:

the liquid discharge head according to claim 1; and a carriage mounting the liquid discharge head and configured to move the liquid discharge head.

11. A liquid discharge apparatus, comprising:

a nozzle plate having a nozzle from which a liquid is discharged;

a housing holding the nozzle plate;

a valve having a leading end and a rear end opposite to the leading end in a longitudinal direction of the valve, the valve configured to open and close the nozzle;

an expandable driver disposed inside the housing and having:

a first end that supports the rear end of the valve; and a second end opposite to the first end, the second end fixed to the housing, the expandable driver configured to move the valve in the longitudinal direction to push the leading end of the valve against the nozzle to close the nozzle; and a restraint configured to position the second end of the expandable driver with respect to the housing in the longitudinal direction, wherein $\Delta L1$ is equal to $\Delta L2$, where $\Delta L1$ represents a thermal deformation amount of a first length L1, from the restraint to the leading end of the valve, due to temperature change $\Delta T$, and $\Delta L2$ represents a thermal deformation amount of a second length L2, from the restraint to an inner surface of the nozzle plate to which the leading end of the valve contacts, due to the temperature change $\Delta T$.

* * * * *